United States Patent
Quenot

[15] 3,675,334
[45] July 11, 1972

[54] TAPE MEASURES
[72] Inventor: Andre Quenot, Besancon, France
[73] Assignee: Manufacture "Quenot Mabo,", Besancon, France
[22] Filed: May 25, 1970
[21] Appl. No.: 41,129

[30] Foreign Application Priority Data
May 29, 1969 France .................. 6917643

[52] U.S. Cl. ........................ 33/138, 188/82.84
[51] Int. Cl. ........................... G01b 3/10
[58] Field of Search ........................ 33/138–140; 242/84.8, 107.12, 107.2, 107.6, 107.7; 188/65.1, 82.84; 24/136 A

[56] References Cited
UNITED STATES PATENTS
2,142,387  1/1939  Udell .................................. 33/138
2,905,274  9/1959  Cook .................................. 242/107.2
1,473,580  11/1923  Hauptmann ....................... 188/82.84
2,148,590  2/1939  Tamarin ............................ 242/107.2
3,205,004  9/1965  Spouge ............................. 242/107.2

Primary Examiner—Leonard Forman
Assistant Examiner—Charles E. Phillips
Attorney—Robert E. Burns and Emmanuel J. Lobato

[57] ABSTRACT

A locking device for a measuring tape which is automatically windable into a casing the device including a roller movably mounted within the casing and in an operative position in which it wedges the tape between a supporting surface and a surface inclined thereto. The roller is automatically removed from the operative position when the tape is pulled out and can be removed manually from the operative position by a push-button to allow rewinding of the tape.

4 Claims, 4 Drawing Figures

TAPE MEASURES

There already exist numerous locking devices for graduated tapes rewindable inside linear measuring instrument casings. These devices generally comprise either levers directly or indirectly operable by the user and subject to the action of a spring for locking the tape, a cam pressing on the tape, or push-buttons forcing the tape against an element of the case. Such devices enable an efficient braking or locking effect to be obtained; however, if the spring operating the locking device deteriorates, the locking effect is no longer satisfactory. Additionally, efficient locking of the tape can cause deterioration of the graduations by friction against the braking component, either at the moment of locking or when the brake is fully locked, if the user should accidentally pull the tape.

It is an object of the invention to provide improved locking means for a tape automatically rewindable into a casing which is not subject to the abovementioned drawbacks and which can be of simple and sturdy construction.

According to the invention, a linear measuring instrument comprises a casing, a tape wound in and unwindable from the casing, a roller removably locatable in an operative tape-locking position contacting one side of the tape at a portion of its path in the casing, a supporting surface adjacent the other side of the tape at said portion of its path, and means for preventing rotation of the roller in a direction corresponding to winding of the tape into the casing when the roller is in operative position and for urging the tape against the supporting surface under the action of means tending to wind the tape into the casing.

The invention will now be described by way of example with reference to the accompanying drawings, in which.

Figure 1:
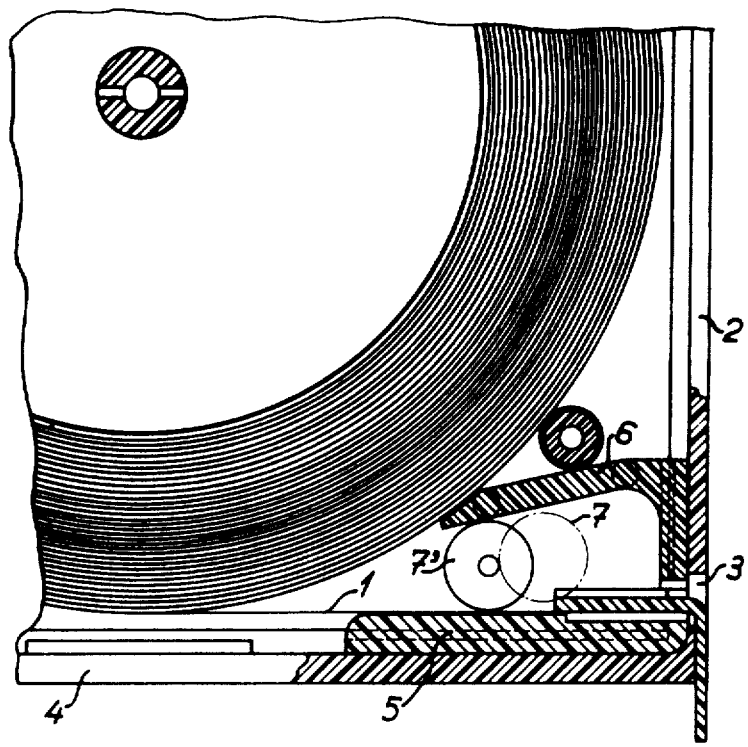
FIG. 1 is a partial cross-section through a linear measuring instrument casing provided with a locking device according to the invention.
Figure 2:
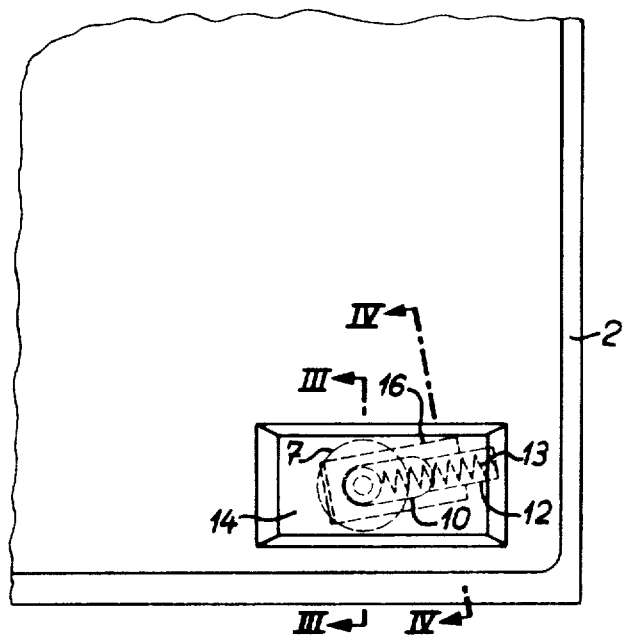
FIG. 2 is a schematic view of part of the casing showing push-button means for actuating the locking device.
Figure 3:
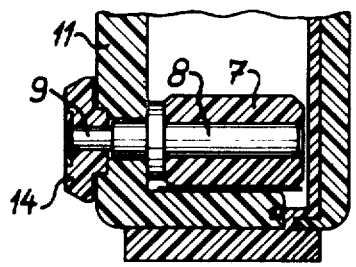
FIG. 3 is a cross-section along line III—III of FIG. 2.
Figure 4:
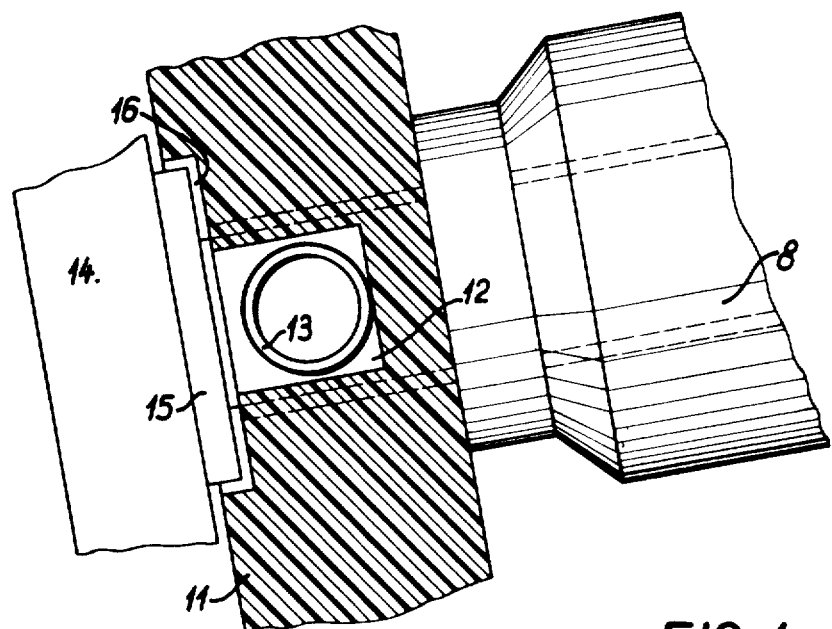
FIG. 4 is a cross-section along line IV—IV of FIG. 2, on an enlarged scale.

A measuring tape 1 is wound inside casing 2 and an end thereof passes through a slot 3 therein. The part of the lower surface 4 of casing 2 adjacent the slot 3 has an element 5, the upper surface of which is parallel to the path of the tape 1 near the said slot 3. This element 5, forms the locking surface and is preferably made of a synthetic material.

Inside casing 2, and on the other side of the part of tape 1 near the slot 3, is a ramp 6 forming an inclined plane so as to be able to guide a roller 7. This roller 7 is free to rotate and can be guided either by means of a push-button or by a spring, or it can be completely free. In any case this roller is brought towards the most confined part of the space between ramp 6 and surface 5 by the tape 1 which tends to return into the case under the action of a return spring (not shown). If the angle formed by surface 5 and ramp 6 is smaller than the angle of friction between the roller and the surfaces 5 and 6, the roller squeezes the tape in such a way that the more the tape tends to return into the case the stronger is the locking effect. It can be seen that any traction tending to pull the tape out of the casing causes the roller 7 to move towards the slot 3 and frees the tape.

In the illustrated embodiment, the roller 7, guided by the ramp 6 is rotatably mounted on an axle 8 one of the ends 9 of which projects through a slot 10 in the wall of the casing 2 and parallel to the direction of the ramp 6. A small opening 12 is made on the inner surface 11 of case 2 along the axis of slot 10 to accommodate a spring 13 urging the axle 8 so as to normally maintain the roller in the tape locking position.

The end 9 of axle 8 is integral with a push-button 14, a shoulder 15 of which is guided by a rectangular inset 16 in wall 11. It can be seen that by manually operating push-button 14 to compress the spring 13, the user moves the roller 7 away from the locking surface 5 and thereby frees the tape. When pressure on the push-button 14 is released, the spring 13 urges the roller 7 back to the locking position.

It is also possible to dispense with the device comprising a spring 13 and push-button 14. In such a case the tape can be unlocked simply by pulling it out of the casing or, alternatively, by aligning the casing such that gravity causes the roller 7 to fall towards slot 3.

The tape of the device according to the invention is thus self-locking whilst rotation of the roller during displacement thereof considerably reduces rubbing during locking and unlocking and thereby prevents damage to the graduated face of the tape. Similarly, should the locked tape be accidentally pulled by the user, the roller cannot oppose withdrawal of the tape with a force sufficient to damage the surface thereof.

Various modifications to the described device can be made, for example ramp 6 could be omitted and the roller or its axle could be guided by one or two grooves or ridges on one or both walls of the casing, the grooves or ridges being wedge-shaped so as to rotationally lock the roller or its axle when in the operative position. Similarly, the device for urging the roller on to the locking position and the means enabling momentary unlocking of the roller can be produced in various other manners.

It is also possible to locate the roller adjacent a rolled part of the tape so that the roller part forms a supporting surface, the casing wall (possibly inclined) supporting the roller so that it presses against the roll of tape under the action of the return spring, and the roller having a sufficiently large diameter to adapt to the reduction of diameter of the rolled tape as the tape is wound out.

What is claimed is:

1. In a linear measuring instrument comprising a casing having an opening, a coil of tape wound in and unwindable from the casing through said opening, means tending to wind the tape into the casing, said casing having a fixed surface for supporting the tape between said coil and said opening, an improved locking device comprising an inclined ramp on the opposite side of the tape from said supporting surface, said tape passing between said supporting surface and said ramp, a cylindrical roller disposed in the casing between said ramp and the tape supported by said supporting surface with the axis on the roller disposed transversely to the tape, the distance between an inner portion of said ramp nearer said coil and the tape supported by said supporting surface being less than the diameter of the roller and the distance between an outer portion of said ramp nearer said opening of the casing and the tape supported by said supporting surface being greater than the diameter of the roller, said roller being movable transversely of its axis between an inner locking position in which it wedges between said ramp and the tape supported by said supporting surface to prevent the tape from winding into the casing and an outer released position in which the tape is released to wind into the casing, spring means for biasing the roller to locking position to lock the tape and means for manually moving said roller to a released position to release the tape.

2. A linear measuring instrument according to claim 1, wherein said casing has a slot therethrough, and further comprising an axle, said roller being pivotally mounted on said axle, and said axle having one end which protrudes through said slot in the casing, and wherein said means for manually moving said roller comprises a push-button disposed externally of said casing and connected with the protruding end of the axle.

3. A linear measuring instrument as set forth in claim 2, in which said casing has a groove in an internal side wall thereof, said groove being opposed to and disposed in parallel with said slot for receiving the other end of said axle, said spring being disposed within said casing for urging said roller into said operative position.

4. In a linear measuring instrument comprising a casing having an opening, a coil of tape wound in and unwindable from the casing through said opening, means tending to wind the tape into the casing, said casing having a fixed surface supporting the tape on one side between said coil and said opening, an improved locking device comprising an inclined ramp on the opposite side of the tape, a cylindrical roller disposed in the casing between said ramp and the tape supported by said supporting surface with the axis of the roller disposed transversely of the tape, the distance between an inner portion of said ramp nearer said coil and said supporting surface being less than the diameter of said roller and the distance between an outer portion of said ramp nearer said opening and said supporting surface being greater than the diameter of the roller, said roller being movable transversely of its axis between an inner locking position in which it wedges between said ramp and the tape supported by said supporting surface to prevent the tape from winding into the casing and an outer released position in which the tape is released to wind into the casing, said casing having a side wall with a slot parallel to said ramp, said roller having an axle with an end projecting on through said slot to the exterior of the casing and a push button on the projecting end of said axle for manual movement of said roller between a locking position and a released position.

* * * * *